(12) United States Patent
Weber et al.

(10) Patent No.: US 12,478,605 B2
(45) Date of Patent: Nov. 25, 2025

(54) BIOCHANIN A DERIVATIVES FOR TREATMENT OF BEST1-RELATED RETINOPATHIES

(71) Applicant: Universität Regensburg, Regensburg (DE)

(72) Inventors: Bernhard Weber, Obertraubling (DE); Andrea Milenkovic, Köfering (DE); Sabine Amslinger, Aschheim (DE); Lisa Marie Dürr, Regensburg (DE)

(73) Assignee: UNIVERSITÄT REGENSBURG, Regensburg (DE)

( * ) Notice: Subject to any disclaimer, the term of this patent is extended or adjusted under 35 U.S.C. 154(b) by 592 days.

(21) Appl. No.: 17/995,093

(22) PCT Filed: Mar. 30, 2021

(86) PCT No.: PCT/EP2021/058287
§ 371 (c)(1),
(2) Date: Sep. 29, 2022

(87) PCT Pub. No.: WO2021/198254
PCT Pub. Date: Oct. 7, 2021

(65) Prior Publication Data
US 2023/0149344 A1 May 18, 2023

(30) Foreign Application Priority Data

Mar. 30, 2020 (EP) .................................. 20166646

(51) Int. Cl.
*A61K 31/352* (2006.01)
*A61P 27/02* (2006.01)
(52) U.S. Cl.
CPC ............ *A61K 31/352* (2013.01); *A61P 27/02* (2018.01)
(58) Field of Classification Search
None
See application file for complete search history.

(56) References Cited

FOREIGN PATENT DOCUMENTS

| CN | 105960238 A | 9/2016 |
|----|-------------|--------|
| IN | 1251DELNP2010 A | 2/2010 |
| WO | WO 99/18953 | 4/1999 |
| WO | WO 2008/011083 | 1/2008 |
| WO | WO 2009/065141 | 5/2009 |

OTHER PUBLICATIONS

Chowers. Progress in Retinal and Eye Research, 2015, 47, 64-85 (Year: 2015).*
Jiang. Arabian Journal of Chemistry, 2020, 13, 7773-7797, available online Sep. 21, 2020 (Year: 2020).*
Fokialakis, Nikolas et al. "Ester and carbamate ester derivatives of Biochanin A: synthesis and in vitro evaluation of estrogenic and antiproliferative activities." *Bioorganic & medicinal chemistry* vol. 20,9 (2012): 2962-70.
Galietta, L V et al. "Cell-based assay for high-throughput quantitative screening of CFTR chloride transport agonists." *American journal of physiology. Cell physiology* vol. 281,5 (2001): C1734-42.
International Search Report and Written Opinion issued in International Application No. PCT/EP2021/058287, mailed Jun. 22, 2021.
Mehrabadi, Maryam Eskandari et al. "Effect of Biochanin A on Retina Levels of Vascular Endothelial Growth Factor, Tumor Necrosis Factor-Alpha and Interleukin-1Beta in Rats With Streptozotocin-Induced Diabetes." *Canadian journal of diabetes* vol. 42,6 (2018): 639-644.

(Continued)

*Primary Examiner* — Noble E Jarrell
(74) *Attorney, Agent, or Firm* — pH IP Law

(57) ABSTRACT

The present invention refers to Biochanin A derivative as defined in formula (II) or a salt thereof for use in a method of treating or preventing BEST1-related retinopathies such as autosomal dominant Best vitelliform macular dystrophy. The present invention also refers to a pharmaceutical composition comprising a Biochanin A derivative as defined in formula (II) or a salt thereof and a pharmaceutical acceptable excipient and/or carrier for use in a method of treating or preventing BEST1-related retinopathies such as autosomal dominant Best vitelliform macular dystrophy. In addition, the present invention refers to a pharmaceutical pack comprising one or more compartments, wherein at least one compartment comprises a Biochanin A derivative as defined in formula (II) or a salt thereof or the pharmaceutical composition of the present invention for use according to the present invention or eye drops, an eye ointment or an implantable device, in particular a micro-drug delivery system, comprising (i) a Biochanin A derivative as defined in formula (II) or (ii) a pharmaceutical composition according to the present invention for use according to the present invention.

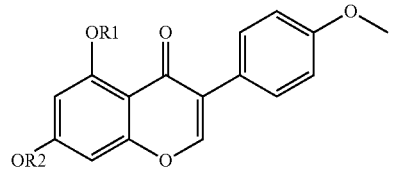

(II)

17 Claims, 8 Drawing Sheets

Figure 1:
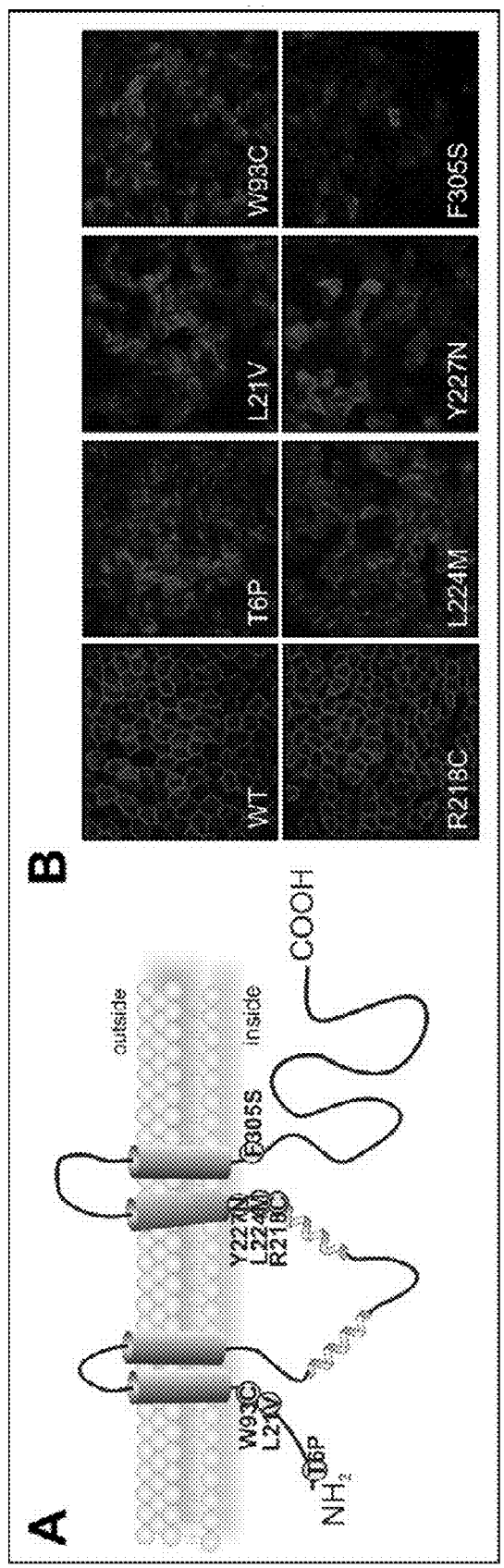

Specification includes a Sequence Listing.

(56) References Cited

OTHER PUBLICATIONS

Milenkovic, Andrea et al. "BEST1 protein stability and degradation pathways differ between autosomal dominant Best disease and autosomal recessive bestrophinopathy accounting for the distinct retinal phenotypes." *Human molecular genetics* vol. 27,9 (2018): 1630-1641. doi:10.1093/hmg/ddy070.

Milenkovic, Andrea et al. "The Y227N mutation affects bestrophin-1 protein stability and impairs sperm function in a mouse model of Best vitelliform macular dystrophy." *Biology open* vol. 8,7 bio041335. Jul. 2, 2019.

Moon, Young Jin et al. "Pharmacokinetics and bioavailability of the isoflavone biochanin A in rats." *The AAPS journal* vol. 8,3 E433-42. Jul. 7, 2006.

Nachtigal, Anna-Lena et al. "Mutation-Dependent Pathomechanisms Determine the Phenotype in the Bestrophinopathies." *International journal of molecular sciences* vol. 21,5 1597. Feb. 26, 2020.

Yu, Chen et al. "Perspectives Regarding the Role of Biochanin A in Humans." *Frontiers in pharmacology* vol. 10 793. Jul. 12, 2019.

\* cited by examiner

BIOCHANIN A DERIVATIVES FOR TREATMENT OF BEST1-RELATED RETINOPATHIES

This application is a national phase application under 35 U.S.C. § 371 of International Application No. PCT/EP2021/058287, filed Mar. 30, 2021, the entire contents of which are hereby incorporated by reference, and which claims benefit of priority to European Application No. 20166646.8, filed Mar. 30, 2020.

The present invention refers to Biochanin A derivative as defined in formula (II) or a salt thereof for use in a method of treating or preventing BEST1-related retinopathies such as autosomal dominant Best vitelliform macular dystrophy. The present invention also refers to a pharmaceutical composition comprising a Biochanin A derivative as defined in formula (II) or a salt thereof and a pharmaceutical acceptable excipient and/or carrier for use in a method of treating or preventing BEST1-related retinopathies such as autosomal dominant Best vitelliform macular dystrophy. In addition, the present invention refers to a pharmaceutical pack comprising one or more compartments, wherein at least one compartment comprises a Biochanin A derivative as defined in formula (II) or a salt thereof or the pharmaceutical composition of the present invention for use according to the present invention or eye drops, an eye ointment or an implantable device, in particular a micro-drug delivery system, comprising (i) a Biochanin A derivative as defined in formula (II) or (ii) a pharmaceutical composition according to the present invention for use according to the present invention.

BEST1 (MIM 607854) belongs to the bestrophin family of four evolutionarily related genes (BEST1-4), that each encode an integral membrane protein. In humans, they function as calcium-activated anion channels although each is specific in terms of gene regulation and tissue distribution. Mutations in BEST1 which localizes most prominently to the basolateral plasma membrane of the human retinal pigment epithelium (RPE) in the back of the eye are linked to at least four distinct retinopathies, the so called bestrophinopathies, including the autosomal dominant Best vitelliform macular dystrophy (BVMD; MIM 153700) (Marquardt et al., 1998; Petrukhin et al., 1998), the autosomal dominant vitreoretinochoroidopathy (ADVIRC; MIM 193220) (Yardley et al., 2004) as well as the autosomal recessive bestrophinopathy (ARB; MIM 611809) (Burgess et al., 2008). Finally, a phenotype known as pattern dystrophy can be separated from the typical BVMD and is inherited as an autosomal dominant trait with a specific single mutation in BEST1, p.(Ala243Val) (Boon et al. 2009; Khan et al. 2018).

BVMD is the most common pathology of the bestrophinopathies with an estimated prevalence between 1:5 000 and approximately 1:50 000. It is a progressive disorder with typical early onset. The disease is characterized by an accumulation of lipofuscin-like material that resembles an "egg yolk (=vitelliform) in the macular area of the posterior pole. Later, the disintegration of lesions leads to atrophy of the RPE/photoreceptor complex and consequently to vision impairment. An important diagnostic feature is an abnormal Arden ratio (light peak/dark trough ratio) in the electro-oculogram (EOG) response. In contrast to healthy persons Best macular dystrophy patients reveal a reduction in the slow light peak rise, a component thought to reflect an increase in chloride conductance across the basolateral membrane of the RPE.

To date, more than 250 independent disease-causing mutations in the BEST1 gene have been reported in the Human Gene Mutation Database. These mutations affect BEST1 localization, protein stability and ion gating properties. As a consequence, these functional impairments result in loss of BEST1 chloride transport function.

X-ray structures of chicken BEST1-Fab complexes revealed that the eukaryotic BEST1 channel is a pentameric structure composed of five homomeric BEST1 subunits forming a long 95 Å pore just wide enough for a dehydrated chloride ion to pass. Two constrictions in the pore, the so-called "neck" and the "aperture", are responsible for ion gating and ion selectivity, respectively. Cryo-electron microscopy and electrophysiological recordings revealed that the introduction of various mutations into the chicken BEST1 structure causes (i) changes in the relative permeabilities among anions, (ii) produces channels with dramatically altered gating properties and (iii) diminishes channel inactivation.

So far, there is no treatment for BVMD or any of the BEST1-linked retinopathies. As surprisingly found, Biochanin A diacetate and several further Biochanin A derivatives can be used to specifically address amelioration of impaired BEST1 channel functionality. They are able to restore (BEST1-mediated) anion transport to address the primary defect in BEST1-associated bestrophinopathies such as BEST1-related BVMD, namely impairment of chloride conductance.

The problem to be solved by the present invention was thus to provide compounds which are able to restore (BEST1-mediated) anion transport to address the primary defect in BEST1-associated bestrophinopathies such as BEST1-related BVMD, in particular autosomal dominant BVMD, namely impairment of chloride conductance.

Biochanin A diacetate is a bioactive substance that belongs to the class of isoflavones. Isoflavones belong to the polyphenol group, possess both estrogen-agonist and estrogen-antagonist properties and are present in significant concentrations in certain plants such as soy or red clover. According to WO 2008/011083 Biochanin A diacetate is known for use in a method of treating ischemia, hypoxia or a neurodegenerative disease.

The problem underlying the present invention is solved by the subject matter defined in the claims.

The following figures serve to illustrate the invention.

FIG. 1 depicts the generation of MDCKII stable cell lines expressing normal and mutant BEST1. (A) Seven disease associated mutations representing the hotspot mutational regions of the protein were selected as shown in FIG. 1A. Normal BEST1 sequences were cloned into pcDNA3 and mutants were generated by site-directed mutagenesis. (B) Normal (WT) and mutant (p.(T6P), p.(L21V), p.(W93C), p.(R218C), p.(L224M), p.(Y227N), p.(F305S)) BEST1 constructs were stably transfected in MDCKII cells. Single clones were isolated in a selection medium containing G418. Stable cell lines were grown 7 days on coverslips to achieve cell polarity and BEST1 localization was determined by immunocytochemistry.

Figure 2:
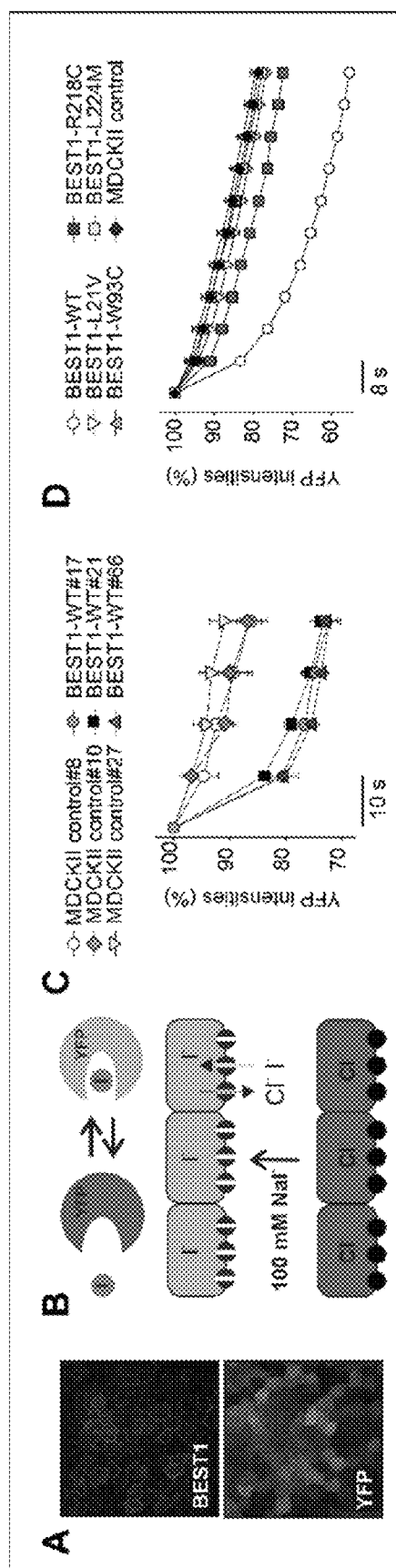

FIG. 2 shows the analysis of BEST1-mediated halide transport in MDCKII cell lines stably co-expressing YFP and normal or mutant BEST1. (A) Representative fluorescence images of MDCKII cell line stably co-expressing wildtype BEST1 and YFP. (B) Graphical illustration of the principle behind the halide transport assay. When iodide ($I^-$) enters the cell through open anion channels, the YFP fluorescence stably expressed in the MDCKII cells is reduced. (C) Time course of cell fluorescence signals in MDCKII cells expressing wildtype BEST1 and untransfected controls (as indicated). Cells were incubated in 100 mM Cl— (=100%) and then Cl— was replaced by I— (n=6). (D) Same experiments as in C. MDCKII cells expressing no, wildtype or mutant BEST1 (as indicated) (n=6).

Figure 3:
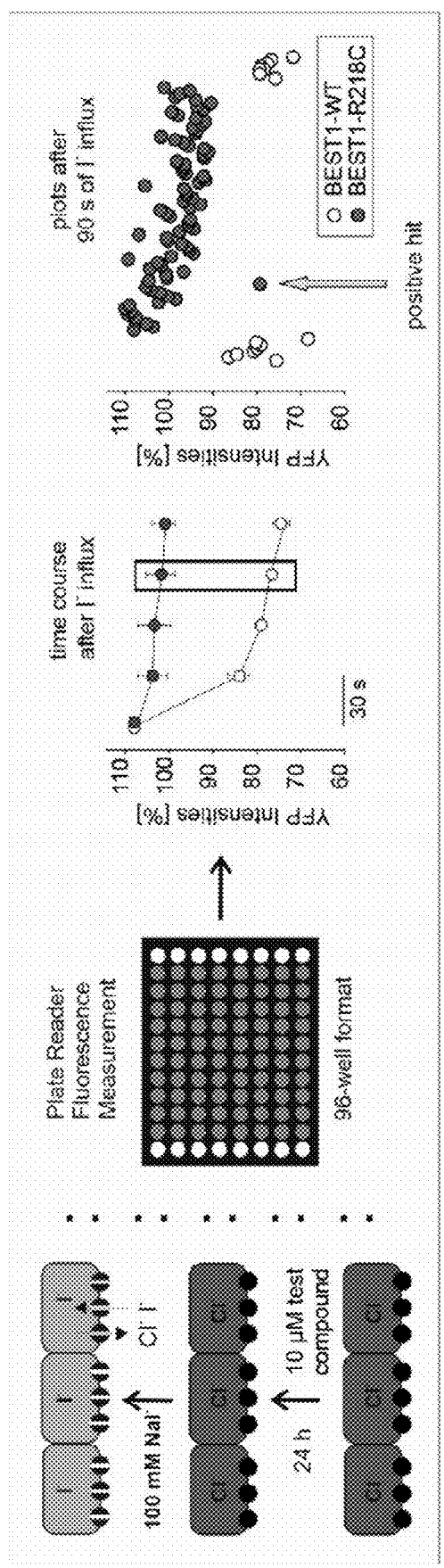

FIG. 3 displays the schematic of the drug screening approach. Stably transfected MDCKII cells co-expressing YFP and BEST1 wildtype (BEST1-WT; white circles) or mutant p.(R218C) (BEST1-R218C; grey circles) were cultivated on black 96-well plates for six days. After addition of a test compound, I⁻ influx was induced by adding an I⁻-containing solution. Each of the grey wells in the eight rows was loaded with a different compound and values of YFP quenching after 90 sec after I⁻ application (boxed) were plotted.

Figure 4:
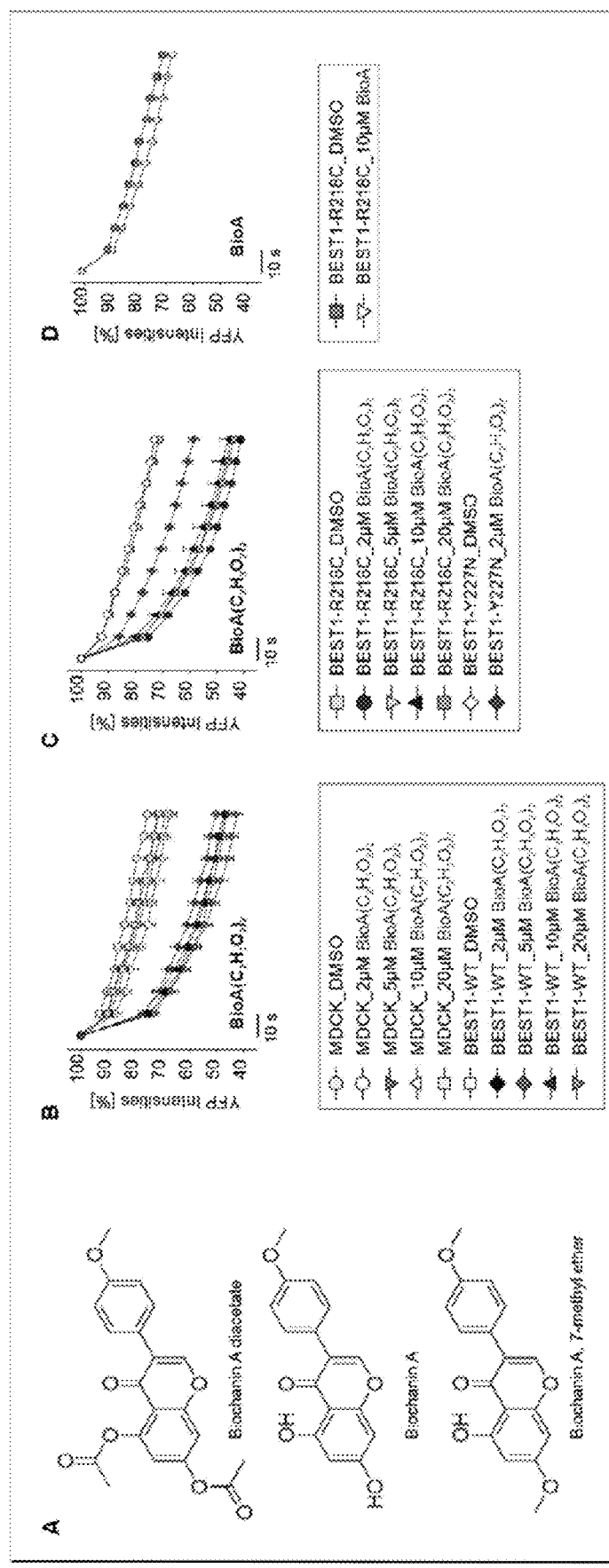

FIG. 4 reveals the effect of $BioA(C_2H_3O_2)_2$ on BEST1 anion transport function in MDCKII cells. (A) Chemical structure of Biochanin A derivatives. Top: Structure of BioA(C2H302)2 having greatest effect on BEST1 anion transport activity: bottom: two BioA-analogs showing no effect. (B-D) BEST1 functional assay as in FIG. 3 after compound addition of BioA(C2H302)2 (FIGS. 4B and 4C) or BioA (FIG. 4D) at indicated concentration.

Figure 5:
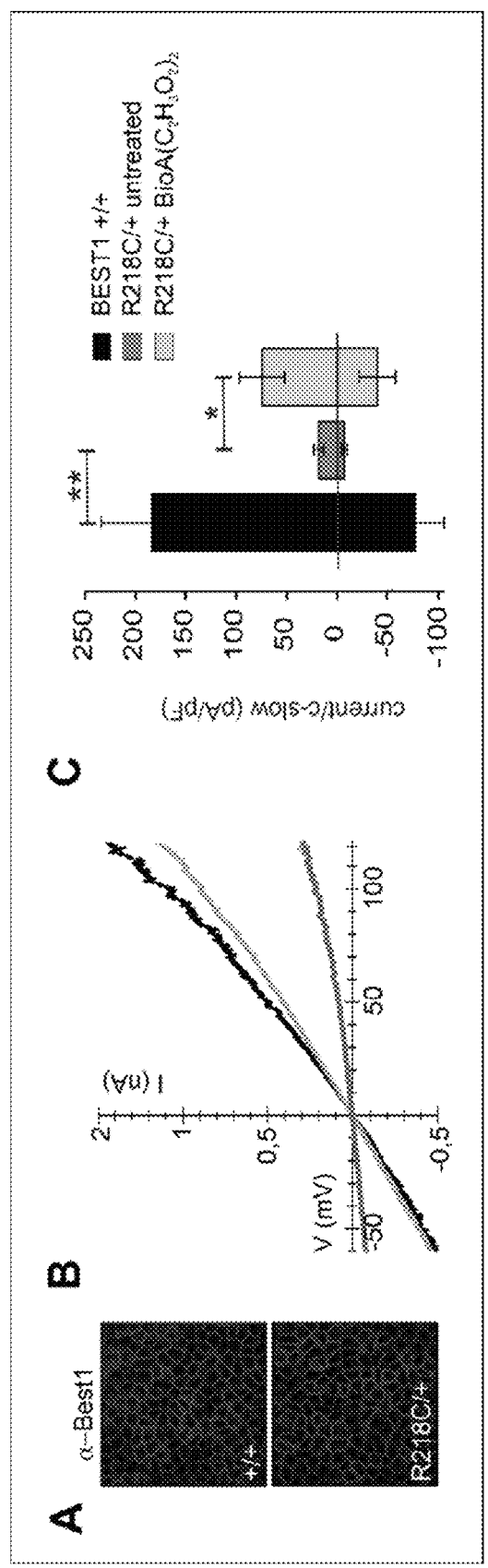

FIG. 5 provides an example of $BioA(C_2H_3O_2)_2$ effects on BEST1 chloride conductance in hiPSC-RPE cells. (A) Immunostaining of BEST1 in +/+ and R218C/+ hiPSC-RPEs (B) IV plot of selected recordings at −60 to 120 mV upon Ca2+ stimulation (0.38 µM Ca2+ free) in +/+(black), untreated (light grey) and $BioA(C_2H_3O_2)_2$ treated (grey) R218C/+ hiPSC-RPEs. (C) Statistical analysis of maximal Ca2+-activated currents at −60 and 120 mV. Data points were corrected for cell capacity. The values are given as mean±SEM. n=8-13; unpaired Student T-Test: * P<0.05; ** P<0.01

Figure 6:
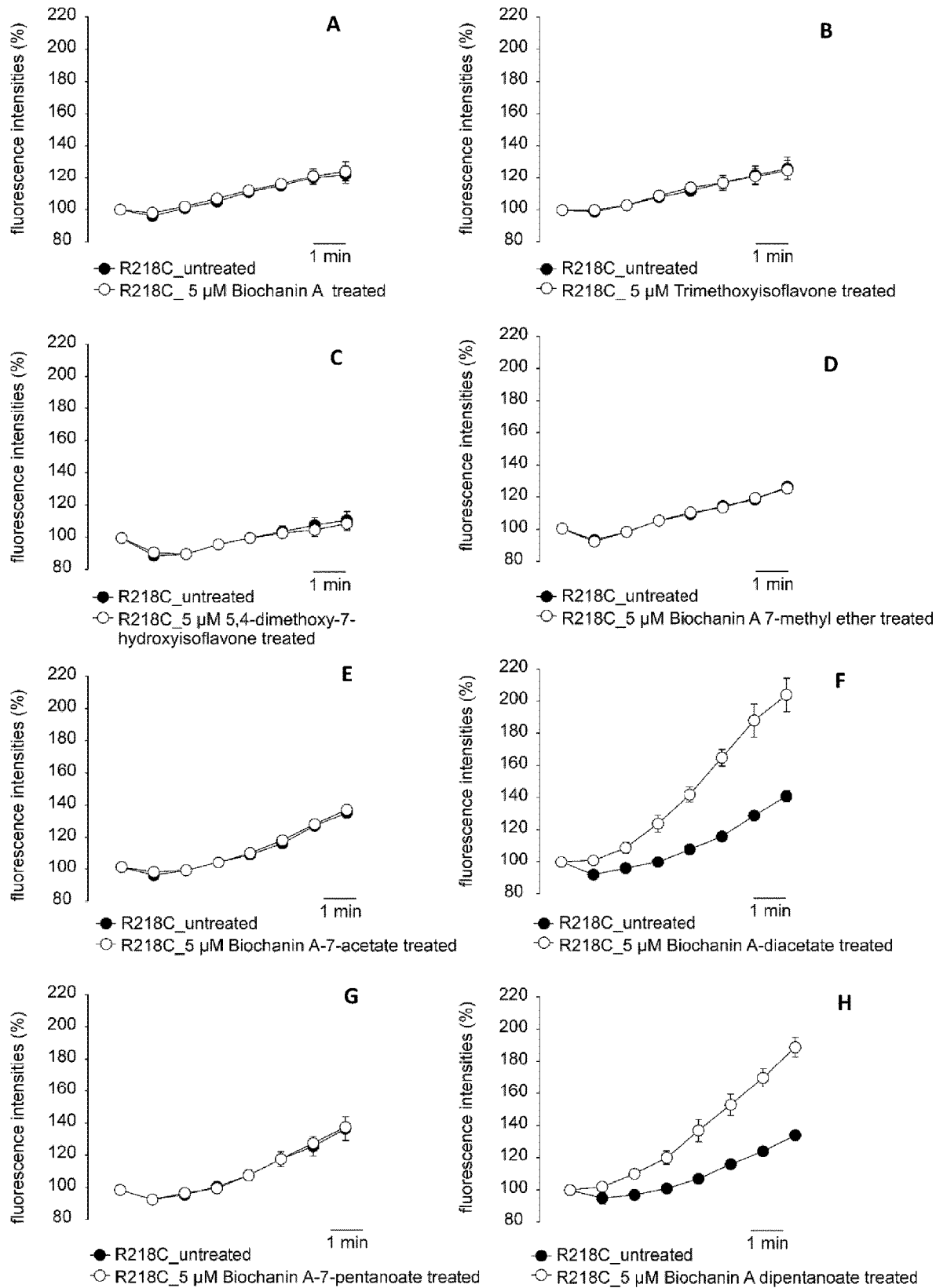

FIG. 6 reveals the effect of Biochanin A (FIG. 6A) and several Biochanin A derivatives, namely Trimethoxyisoflavone (FIG. 6B), 5,4-dimethoxy-7-hydroxyisoflavone (FIG. 6C), Biochanin A-7-methyl ether (FIG. 6D), Biochanin A-7-acetate (FIG. 6E), Biochanin A diacetate (FIG. 6F), Biochanin A-7-pentanoate (FIG. 6G) and Biochanin A dipentanoate (FIG. 6H), on BEST1 anion transport function in MDCKII cells in comparison to untreated MDCKII cells. While Biochanin A (FIG. 6A), Trimethoxyisoflavone (FIG. 6B), 5,4-dimethoxy-7-hydroxyisoflavone (FIG. 6C), Biochanin A-7-methyl ether (FIG. 6D), Biochanin A-7-acetate (FIG. 6E) and Biochanin A-7-pentanoate (FIG. 6G), showed no or only minimal effect upon addition of respective compound delivery in comparison to untreated cells, anion transport activity was strongly increased for mutant BEST1-R218C upon addition of Biochanin A diacetate (FIG. 6F) and Biochanin A dipentanoate (FIG. 6H).

Figure 7:
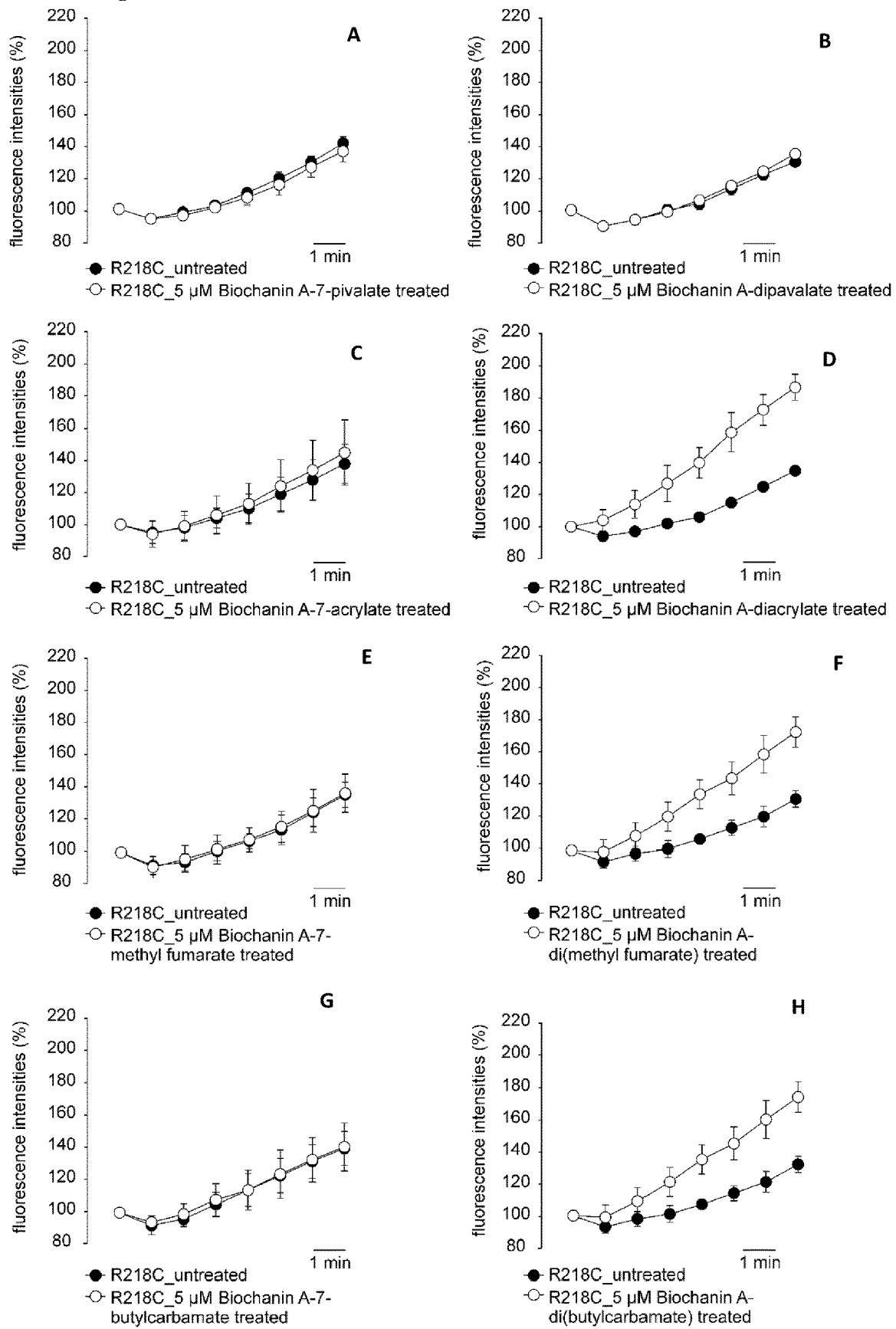

FIG. 7 reveals the effect of several further Biochanin A derivatives, namely Biochanin A-7-pivalate (FIG. 7A), Biochanin A-dipavalate (FIG. 7B), Biochanin A-7-acrylate (FIG. 7C), Biochanin A diacrylate (FIG. 7D), Biochanin A-7-methyl fumarate (FIG. 7E), Biochanin A-di(methyl fumarate) (FIG. 7F), Biochanin A-7-butylcarbamate (FIG. 7G) and Biochanin A di(butylcarbamate) (FIG. 7H) on BEST1 anion transport function in MDCKII cells in comparison to untreated MDCKII cells. While Biochanin A-7-pivalate (FIG. 7A), Biochanin A-7-methyl fumarate (FIG. 7E) and Biochanin A-7-butylcarbamate (FIG. 7G) showed no or only minimal effect upon addition of respective compound delivery in comparison to untreated cells, anion transport activity was noticeable increased for mutant BEST1-R218C upon addition of Biochanin A-dipavalate (FIG. 7B) and Biochanin A-7-acrylate (FIG. 7C) and strongly increased upon addition of Biochanin A diacrylate (FIG. 7D), Biochanin A-di(methyl fumarate) (FIG. 7F) and Biochanin A di(butylcarbamate) (FIG. 7H).

Figure 8:
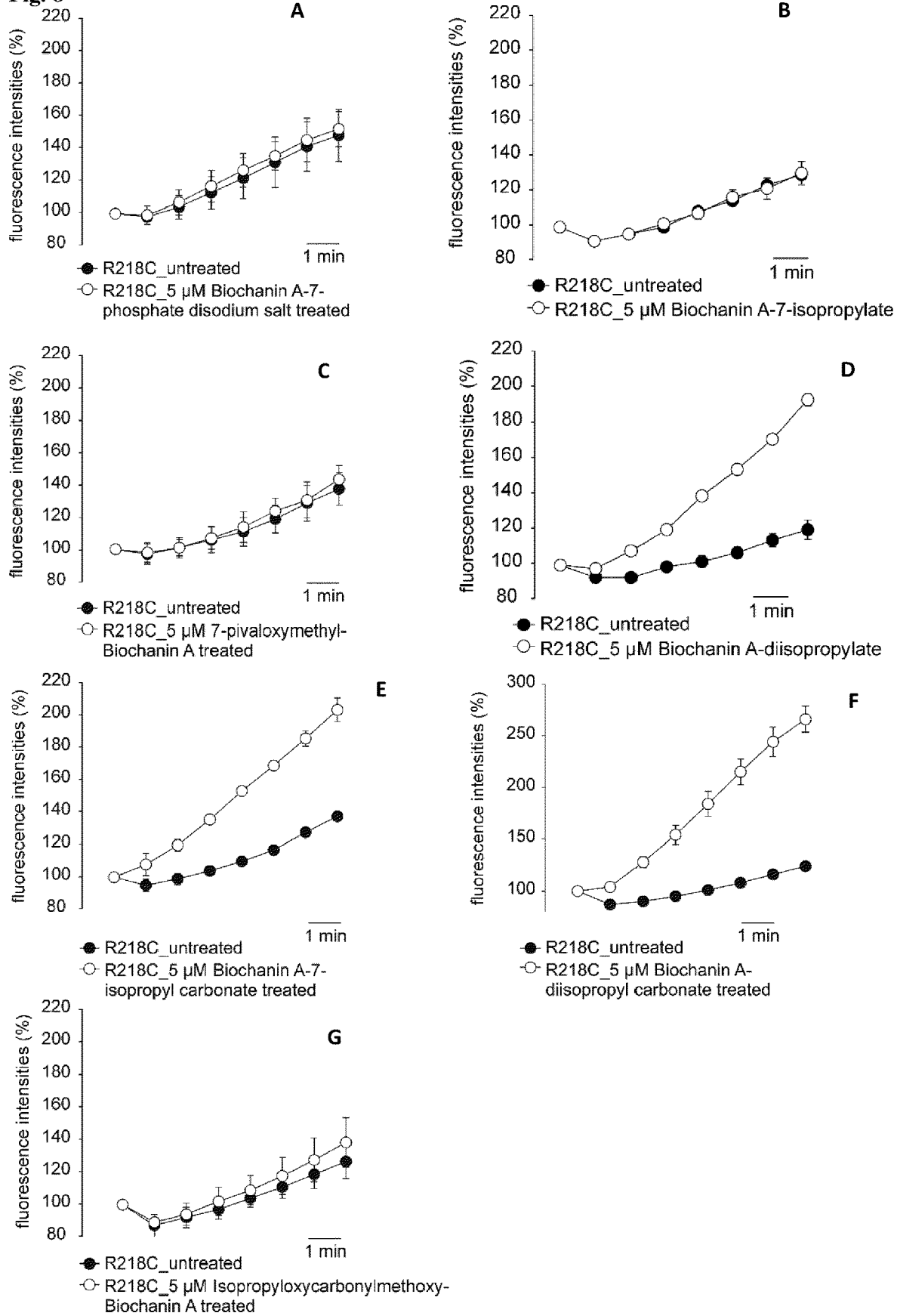

FIG. 8 reveals the effect of several further Biochanin A derivatives, namely Biochanin A-7-phosphate disodium salt (FIG. 8A), Biochanin A-7-isopropylate (FIG. 8B), 7-pivaloxymethyl-Biochanin A (FIG. 8C), Biochanin A diisopropylate (FIG. 8D), Biochanin A-7-isopropyl carbonate (FIG. 8E), Biochanin A diisopropyl carbonate (FIG. 8F) and Isopropyloxy-carbonylmethoxy-Biochanin A (FIG. 8G) on BEST1 anion transport function in MDCKII cells in comparison to untreated MDCKII cells. While Biochanin A-7-isopropylate (FIG. 8B) showed no or only minimal effect upon addition of respective compound delivery in comparison to untreated cells, anion transport activity was noticeable increased for mutant BEST1-R218C upon addition of Biochanin A-7-phosphate disodium salt (FIG. 8A), 7-pivaloxymethyl-Biochanin A (FIG. 8C) and Isopropyloxycarbonylmethoxy-Biochanin A (FIG. 8G) and strongly increased upon addition of Biochanin A diisopropylate (FIG. 8D), Biochanin A-7-isopropyl carbonate (FIG. 8E) and Biochanin A diisopropyl carbonate (FIG. 8F).

The term "Biochanin A diacetate" as used herein refers in particular to a compound of formula

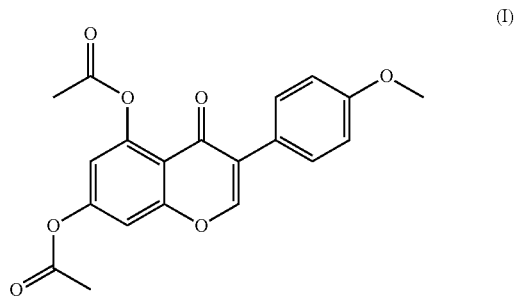 [SMILES: COc1ccc(-c2coc3cc(OC(C)=O)cc(OC(C)=O)c3c2=O)cc1]

(I)

The term "Biochanin A diacetate" as used herein can synonymously be used with the terms "BioA($C_2H_3 O_2$)$_2$" or "3-(4-Methoxyphenyl)-4oxo-4H-chromene-5,7-diyl diacetate".

The term "BEST1-related retinopathies" relates to retinopathies caused by mutations in the BEST1 gene (MIM 607854). BEST1 localizes most prominently to the basolateral plasma membrane of the RPE in the back of the eye. Mutations in BEST1 affect BEST1 localization, protein stability and ion gating properties. As a consequence, these functional impairments result in loss of BEST1 channel function, in particular anion transport function, more preferably chloride transport function, which causes a damage of the retina of the eye.

The term "BEST1" as used herein is a shortcut for bestrophin-1. It can synonymously be used with the term "VMD2". BEST1 belongs to the bestrophin family of four evolutionary related genes (BEST1-4), that encode for integral membrane proteins. In humans, they function in particular as calcium-activated anion channels although each is specific in terms of gene regulation and tissue distribution of the protein. Wildtype BEST1 has preferably an amino acid sequence as shown in SEQ ID NO: 1. Wildtype BEST1 is preferably encoded by a nucleic acid sequence as shown in SEQ ID NO: 2.

The term "bestrophinopathy" refers to a group of phenotypes of degenerative retinal diseases caused by one or more mutations in the BEST1 gene, in particular one mutation (in the case of autosomal dominant inheritance) or two mutations (in case of autosomal recessive inheritance) in the BEST1 gene.

The term "Best vitelliform macular dystrophy (BVMD)" as used herein may also be called "Best macular dystrophy", "vitelliform macular dystrophy-2 (VMD2)", or short "Best disease". It is a hereditary retinal dystrophy involving the RPE/photoreceptor complex, characterized in early stages of the diseases by the appearance of yellow "egg-yolk"-like lesions in the macular area. It is the most common phenotype of the bestrophinopathies. Subjects suffering from autosomal dominant Best vitelliform macular dystrophy have a mutation in the BEST1 gene which leads to a loss of channel function and eventually retinal degeneration.

The term "autosomal dominant vitreoretinochoroidopathy (ADVIRC)" refers to a chorioretinal pigmentary disorder affecting the peripheral retina. According to the state of the art in particular the five BEST1 gene mutations p.(Gly83Asp), p.(Val86Met), p.(Val235A1a), p.(Tyr236Cys), and p.(Val239Met) are causative of ADVIRC. The disease is classically characterized by a peripheral retinal circumferential hyperpigmented band with a well-defined posterior demarcation and can be associated with developmental ocular anomalies such as microcornea, microphthalmos, angle closure glaucoma, and cataract. The term "autosomal recessive bestrophinopathy (ARB)" refers to a disease which is caused by homozygous or compound heterozygous BEST1 gene mutations. The main characteristics of ARB are multifocal subretinal deposits outside the macular area, abnormal autofluorescence and subretinal fluid accumulation or macular edema. Heterozygous parents generally show no retinal symptoms.

The term "pattern dystrophy" as used herein refers to a special form of autosomal dominant Best macular dystrophy, which is in particular associated with a p.(Ala243Val) mutation. In this form the vitelliform lesions are missing and, instead, patterned pigment changes are formed. The course of disease is usually mild. Preferably, the term "pattern dystrophy" as used herein is exclusively associated with a p.(Ala243Val) mutation.

Any mutation as described in the present disclosure refers to wildtype BEST1 as shown in SEQ ID NO: 1.

The term "improving chloride conductance" refers to an increased level of measurable chloride conductance in a given assay in the presence of a candidate compound relative to the measurable level of chloride conductivity in the absence of the candidate compound, when tested under the same conditions. The chloride conductance is improved according to the invention if it is enhanced at least about 5%, 10%, 20%, 30%, 40%, 50%, 60%, 70%, 80%, 90%, 95%, 100%, 150%, 200%, 250%, 300% or more than in the absence of the candidate compound. An improved chloride conductance represents an improved anion transport activity. Improvement of chloride conductance and anion transport activity, respectively, can e.g. be tested as described in Example 9 or 10.

The term "restoring BEST1 channel function" particularly refers to a repair of the BEST1 anion transport function, in particular the chloride transport function, if the BEST1 channel function is impaired e.g. by one or more mutations in the BEST1 gene. The repair of BEST1 channel function can be determined in a given assay in the presence of a candidate compound relative to the measurable level of BEST1 channel function in the absence of the candidate compound, when tested under the same conditions and compared to BEST1 channel function of a control having no mutations in the BEST1 gene. The BEST1 channel function is restored according to the invention if at least about 5%, 10%, 20%, 30%, 40%, 50%, 60%, 70%, 80%, 90%, 95% or more of BEST1 channel function can be restored in the presence of the candidate compound. The term "restoring BEST1 channel function" may also be used if the BEST1 channel function is improved at least about 100%, 150%, 200%, 250%, 300% or more in the presence of the candidate compound.

The term "comprising" as used herein shall not be construed as being limited to the meaning "consisting of" (i.e. excluding the presence of additional other matter). Rather, "comprising" implies that optionally additional matter may be present. The term "comprising" encompasses as particularly envisioned embodiments falling within its scope "consisting of" (i.e. excluding the presence of additional other matter) and "comprising but not consisting of" (i.e. requiring the presence of additional other matter), with the former being more preferred.

In a first object of the present invention it is envisaged to provide a modulator of the BEST1 chloride channel, which is able to restore BEST1 channel function. In particular, the present invention provides Biochanin A derivatives or salts thereof for use in a method of treating or preventing BEST1-related retinopathies such as BVMD, in particular autosomal dominant BVMD. Preventing BEST1-related retinopathies such as BVMD comprises preferably delaying the onset and/or progression of BEST1-related retinopathies such as BVMD. Treating BEST1-related retinopathies such as BVMD may also comprise delaying the progression of BEST1-related retinopathies such as BVMD or preventing the reoccurrence of symptoms of the disease after the disease has previously been treated. The Biochanin A derivatives according to the present invention are able to modulate the BEST1 transport channel, in particular by improving the chloride conductance across the basolateral membrane of the RPE of the subject thereby restoring BEST1 channel function. In particular, the Biochanin A derivatives for use according to the present invention are able to compensate reduced anion transport activity of BEST1 by enhancing residual BEST1 channel function or activating other—yet undefined—anion channels in the RPE of subjects.

The Biochanin A derivatives solving the problem underlying the present invention is a Biochanin A derivative according to formula (II):

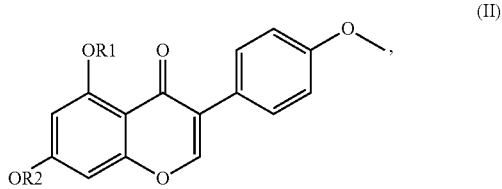

wherein R1 is a proton or any one of the following residues:

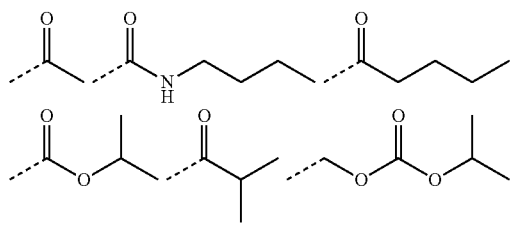

-continued

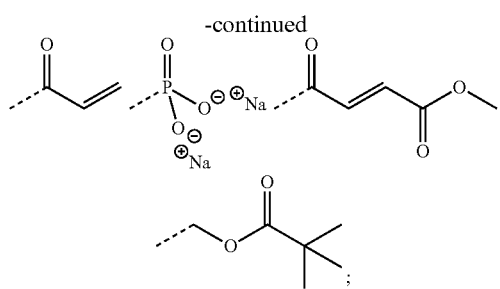

and R2 is anyone of the following residues:

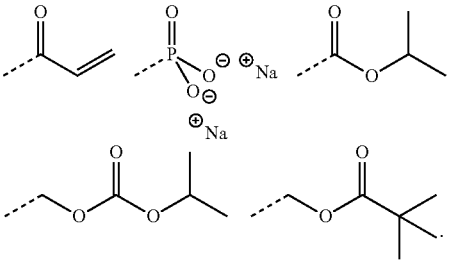

under the provision that when R1 is a proton, R2 is selected from the group consisting of any one of the following residues:

Thus, R1 in formula (I) is preferably a proton, acetate, pentanoate, isopropylate, acrylate, methyl fumarate, butylcarbamate, isopropyl carbonate, isopropyloxycarbonylmethoxy, phosphate disodium salt or pivaloxymethyl and R2 in formula I is preferably acetate, pentanoate, isopropylate, acrylate, methyl fumarate, butylcarbamate, isopropyl carbonate, isopropyloxycarbonylmethoxy, phosphate disodium salt or pivaloxymethyl, under the provision that when R1 is a proton, R2 is acrylate, isopropyl carbonate, isopropyloxycarbonlymethoxy, phosphate disodium salt or pivaloxymethyl.

In a particularly preferred embodiment of the present invention, R1 and R2 in formula (I) are the same or R1 is a proton and R2 is isopropyl carbonate.

In a preferred embodiment, the Biochanin A derivative for use according to the present invention is selected from the group as shown in Table 1. Compounds marked with a star in a circle represent especially preferred Biochanin A derivatives.

TABLE 1

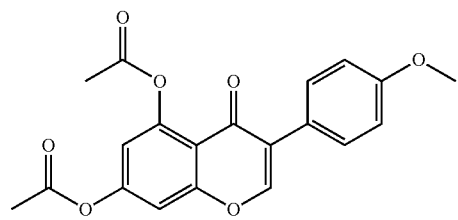 [SMILES: COc1ccc(-c2coc3cc(OC(C)=O)cc(OC(C)=O)c3c2=O)cc1]

Biochanin A diacetate ⊛

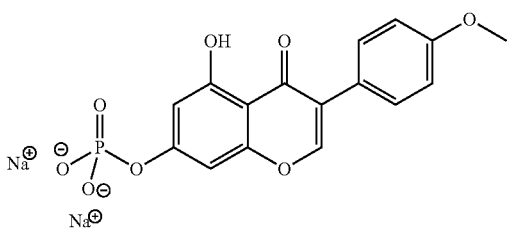 [SMILES: [Na+] ; COc1ccc(-c2coc3cc(OP(=O)([O-])[O-])cc(O)c3c2=O)cc1 ; [Na+]]

Biochanin A-7-phosphate disodium salt

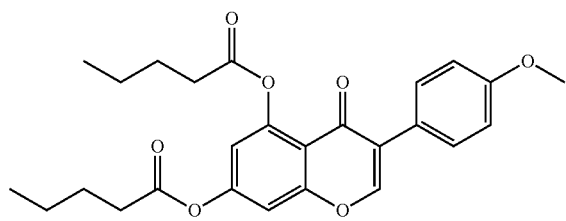 [SMILES: CCCCC(=O)Oc1cc(OC(=O)CCCC)c2c(=O)c(-c3ccc(OC)cc3)coc2c1]

Biochanin A dipentanoate ⊛

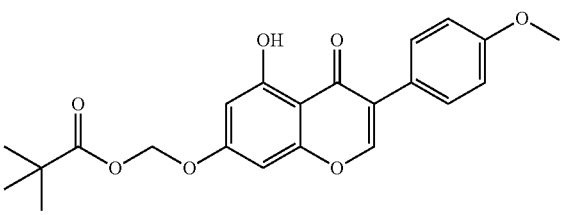 [SMILES: COc1ccc(-c2coc3cc(OCOC(=O)C(C)(C)C)cc(O)c3c2=O)cc1]

7-Pivaloxymethyl-Biochanin A

TABLE 1-continued
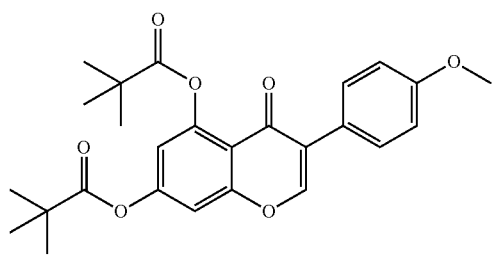 [SMILES: COc1ccc(-c2coc3cc(OC(=O)C(C)(C)C)cc(OC(=O)C(C)(C)C)c3c2=O)cc1]
Biochanin A dipivalate
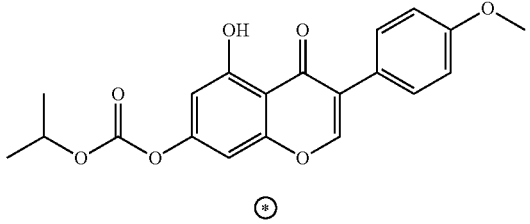
Biochanin A-7-isopropyl carbonate
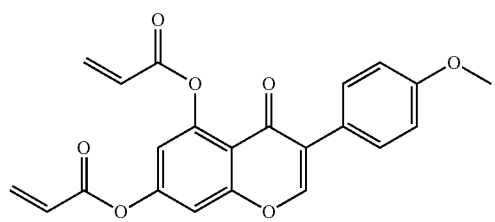 [SMILES: C=CC(=O)Oc1cc(OC(=O)C=C)c2c(=O)c(-c3ccc(OC)cc3)coc2c1]
Biochanin A diacrylate
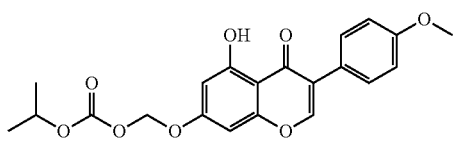 [SMILES: COc1ccc(-c2coc3cc(OCOC(=O)OC(C)C)cc(O)c3c2=O)cc1]
7-Isopropyloxycarbonylmethoxy-Biochanin A
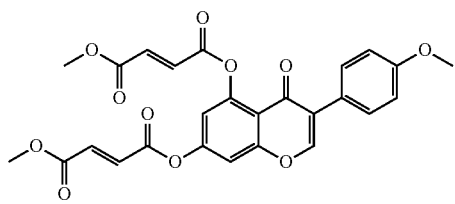
Biochanin A di(methyl fumarate)
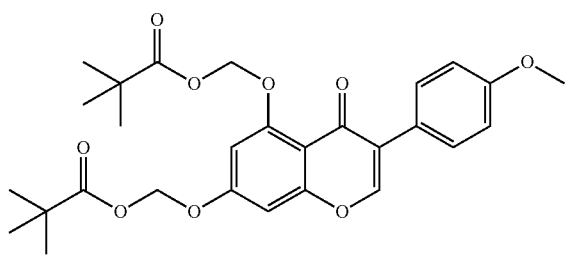 [SMILES: COc1ccc(-c2coc3cc(OCOC(=O)C(C)(C)C)cc(OCOC(=O)C(C)(C)C)c3c2=O)cc1]
Dipivaloxymethyl-Biochanin A
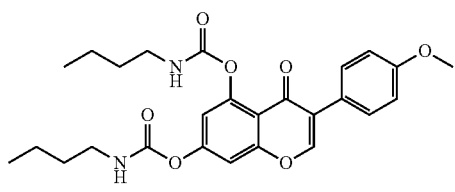 [SMILES: CCCCNC(=O)Oc1cc(OC(=O)NCCCC)c2c(=O)c(-c3ccc(OC)cc3)coc2c1]
Biochanin A di(butylcarbamate)
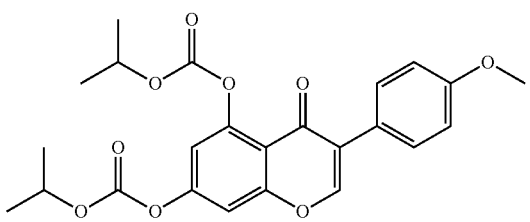 [SMILES: COc1ccc(-c2coc3cc(OC(=O)OC(C)C)cc(OC(=O)OC(C)C)c3c2=O)cc1]
Biochanin A diisopropyl carbonate
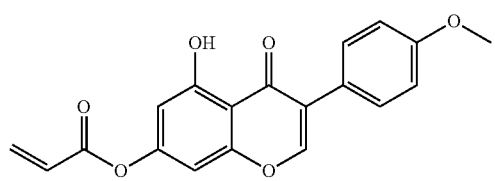 [SMILES: C=CC(=O)Oc1cc(O)c2c(=O)c(-c3ccc(OC)cc3)coc2c1]
Biochanin A-7-acrylate
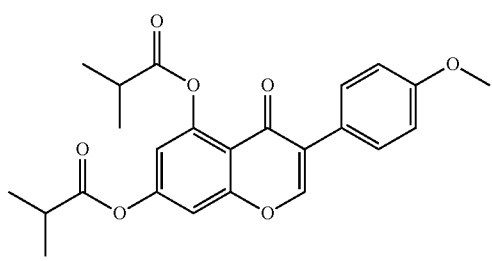 [SMILES: COc1ccc(-c2coc3cc(OC(=O)C(C)C)cc(OC(=O)C(C)C)c3c2=O)cc1]
Biochanin A diisopropylate TABLE 1-continued

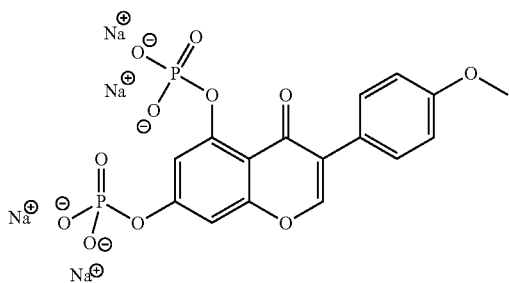 [SMILES: [Na+] ; [Na+] ; COc1ccc(-c2coc3cc(OP(=O)([O-])[O-])cc(OP(=O)([O-])[O-])c3c2=O)cc1 ; [Na+] ; [Na+]]

Biochanin A-7phosphate tetrasodium salt(*)

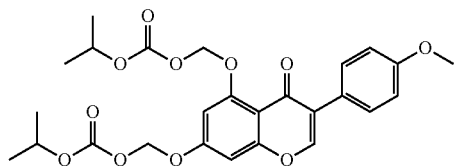 [SMILES: COc1ccc(-c2coc3cc(OCOC(=O)OC(C)C)cc(OCOC(=O)OC(C)C)c3c2=O)cc1]

Diisopropyloxycarbonylmethoxy-Biochanin A(*)

In contrast, the following Biochanin A compounds have been found to have no or only minimal effect on anion transport activity. Accordingly, the following Biochanin A compounds represent no preferred embodiments for use according to the present invention.

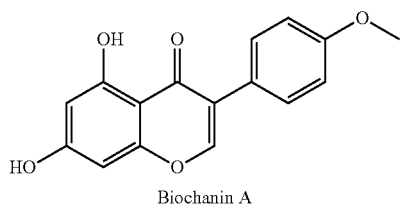

Biochanin A

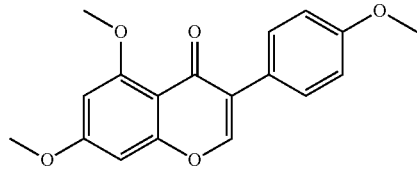

5,7,4'-Trimethoxyisoflavone

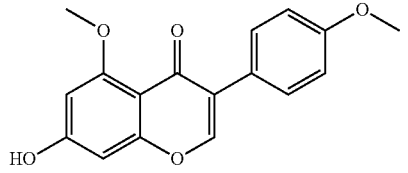

5,4'-Dimethoxy-7-isoflavone

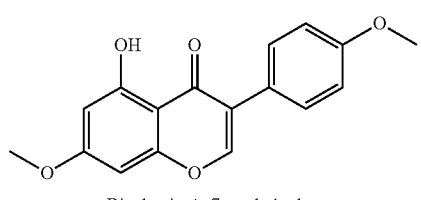

Biochanin A, 7-methyl ether

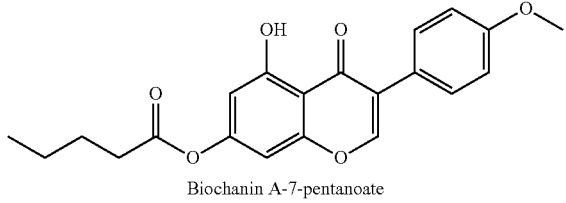

Biochanin A-7-pentanoate

-continued

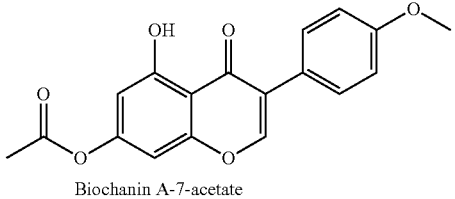

Biochanin A-7-acetate

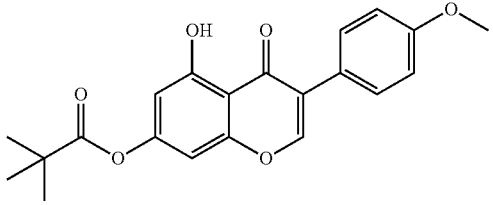

Biochanin A-7-pivalate

Biochanin A-7-butylcarbamate

Biochanin A-7-methyl fumarate

Biochanin A-7-isopropylate

In a preferred embodiment, the Biochanin A derivative for use according to the present invention is selected from the group consisting of: Biochanin A diacetate, Biochanin A dipentanoate, Biochanin A diacrylate, Biochanin A di(methyl fumarate), Biochanin A-7-isopropyl carbonate, Biochanin A di(butylcarbamate), Biochanin A diisopropyl carbonate, Biochanin A diphosphate tetrasodium salt, Dipivaloxymethyl-Biochanin A, Biochanin A diisopropylate, Diisopropyloxycarbonylmethoxy-Biochanin A.

In a further particularly preferred embodiment, the Biochanin A derivative is selected from the group as shown in Table 2.

TABLE 2

| 1 | | Biochanin A diacetate |
| 2 | | Biochanin A dipentanoate |
| 3 | | Biochanin A diacrylate |
| 4 | | Biochanin A di(methyl fumarate) |
| 5 | | Biochanin A-7-isopropyl carbonate |
| 6 | | Biochanin A di(butylcarbamate) |

TABLE 2-continued

| # | Structure | Name |
|---|---|---|
| 7 | | Biochanin A diisopropyl carbonate |
| 8 | | Biochanin A diphosphate tetrasodium salt |
| 9 | | Dipivaloxymethyl-Biochanin A |
| 10 | | Biochanin A diisopropylate |
| 11 | | Diisopropyloxycarbonylmethoxy-Biochanin A |

In a further particularly preferred embodiment the Biochanin A derivative is selected from the group consisting of: Biochanin A diacetate, Biochanin A dipentanoate, Biochanin A diacrylate, Biochanin A di(methyl fumarate), Biochanin A-7-isopropyl carbonate, Biochanin A di(butyl-carbamate), Biochanin A diisopropyl carbonate, Biochanin A diisopropylate. Biochanin A diacetate represents an especially preferred embodiment of the present invention.

The method of treating, preventing and/or delaying the onset or progression of BEST1-related retinopathies such as BVMD preferably comprises the administration of a preferred Biochanin A derivative as defined above or a salt thereof to the subject. Preferably, said Biochanin A derivative or a salt thereof is administered in an amount sufficient to improve chloride conductance across the basolateral membrane of the RPE of the subject. It is preferably administered in an amount sufficient to restore BEST1 channel function. It is preferably administered in an amount sufficient to compensate reduced anion transport activity of BEST1 by enhancing residual BEST1 channel function or activating other—yet undefined—anion channels in the RPE of subjects. In a preferred embodiment the method of treating comprises additionally the step of molecular genetic testing of BEST1. In an especially preferred embodiment, the method comprises the steps of
  (i) evaluating the subject's vision before treatment;
  (ii) molecular genetic testing of the BEST1 gene;
  (iii) administering a preferred Biochanin A derivative as defined above or a salt thereof to the subject; and
  (iv) evaluating of subject's vision after step (iii).

Molecular genetic testing of the BEST1 gene may be performed from DNA extracted from a peripheral blood sample of the subject. Mutation analysis may be done by the Sanger chain termination method, a technique for DNA sequencing based upon the selective incorporation of chain-terminating dideoxynucleotides (ddNTPs) by DNA polymerase during in vitro DNA replication. Specifically, the nucleotide sequence of the 11 coding sequences (exons) and the respective flanking intronic regions (about 20 base pairs each) will be sequenced from the BEST1 gene of the subject.

The present invention also refers to a pharmaceutical composition comprising a preferred Biochanin A derivative as defined above or a salt thereof and a pharmaceutical acceptable excipient and/or carrier for use in a method of treating, preventing and/or delaying the onset or progression of BEST1-related retinopathies as defined above.

The pharmaceutical composition according to the present invention may additionally contain one or more conventional additive(s). Some examples of such additives include a solubilizer such as, for example, glycerol; an antioxidant such as for example, benzalkonium chloride, benzyl alcohol, chloretone or chlorobutanol; and/or an isotonic agent. As a further precaution against oxidation or other spoilage, the pharmaceutical compositions may be stored under a suitable gas, as e.g. nitrogen gas, in vials sealed with impermeable stoppers.

Preferably, the preferred Biochanin A derivative as defined above or a salt thereof and/or the pharmaceutical composition of the present invention is for use in a method of treating or preventing BEST1-related retinopathies, in particular the so-called bestrophinopathies. In a preferred embodiment of the present invention said BEST1-related retinopathies or bestrophinopathies result from an alteration of the BEST1 protein which may be caused by a mutation in the BEST1 gene. Preferably, such BEST1-related retinopathies or bestrophinopathies are caused or characterized by an impaired or reduced anion transport activity of BEST1. The BEST1-related retinopathies or bestrophinopathies may be selected from the group consisting of autosomal dominant Best macular dystrophy, vitelliform macular dystrophy-2 (VMD2), autosomal dominant vitreoretinochoroidopathy (ADVIRC), autosomal recessive bestrophinopathy, or pattern dystrophy, more preferably from the group consisting of autosomal dominant Best macular dystrophy, vitelliform macular dystrophy-2 (VMD2), autosomal recessive bestrophinopathy, or pattern dystrophy. Treating and preventing of autosomal dominant BVMD is especially preferred.

The subject to be treated is preferably a human or an animal, in particular a mammal, most preferably a human. The preferred Biochanin A derivatives as defined above or a salt thereof and/or the pharmaceutical composition of the present invention may be administered to the subject in need thereof in an effective amount. The effective amount of the compound to be administered can be readily determined by those skilled in the art during pre-clinical trials and clinical trials by methods familiar to physicians and clinicians.

In accordance with all embodiments of the present invention, an effective amount of the preferred Biochanin A derivatives as defined above or a salt thereof for use in a method of treating or preventing BEST1-related retinopathies, preferably in a pharmaceutical composition, may be administered to the subject in need thereof by any of a number of well-known methods for administering pharmaceutical compounds. The compound may be administered locally or systemically. The route of administration may be oral, topical, ocular, intraocular, by eye drops, or by intravitreal injection, or any other suitable route of administration.

In another aspect, the present invention relates to a process of preparation of a pharmaceutical composition, said process comprising admixing the Biochanin A derivative or a salt thereof and/or the pharmaceutical composition of the present invention with a pharmaceutically acceptable diluent, excipient or carrier.

The present invention also relates to a pharmaceutical pack comprising one or more compartments, wherein at least one compartment comprises a preferred Biochanin A derivative as defined above or salt thereof or the pharmaceutical composition of the present invention.

In a preferred embodiment the Biochanin A derivative or a salt thereof or the pharmaceutical composition according to the present invention is formulated for topical administration, in particular for intraocular administration. Preferably it is formulated in form of eye drops or eye ointment. Alternatively, the Biochanin A derivative or a salt thereof or the pharmaceutical composition according to the present invention may be formulated for oral administration e.g. in form of a tablet, capsule, dragee or pill but also in form of an injectable solution or any other medical reasonable galenic formulation. Preferably, the galenic formulation may comprise suitable carriers, stabilizers, flavourings, buffers or other suitable reagents.

Thus, the present invention also refers to eye drops or an eye ointment comprising a preferred Biochanin A derivative as defined above or a salt thereof and a pharmaceutical acceptable excipient and/or carrier. Eye drops or an eye ointment or a formulation in form of eye drops or eye ointment can be prepared as known by a person skilled in the art. For example, the eye drops can be prepared using a tonisity agent as e.g. concentrated glycerin or sodium chloride, a buffer as e.g. sodium phosphate or sodium acetate, a surfactant as e.g. polyoxyethylene sorbitan monooleate or polyoxyl 40 stearate, a stabilizer as e.g. sodium citrate or sodium edetate and/or a preservative such as benzalkonium chloride or paraben. The pH of the eye drops is preferably within the range that is acceptable for ophthalmic preparation. For example, it may be in the range of from pH 4 to 8. The eye ointment can be prepared with a generally used base such as white soft paraffin or liquid paraffin.

In a preferred embodiment, the Biochanin A derivative or a salt thereof or the pharmaceutical composition according to the present invention is formulated for intraocular administration, in particular in form of an implantable device, in particular a micro-drug-reservoir, for efficient and controlled ocular drug delivery, in particular intraocular drug delivery. When the reservoir is implanted, physicians can replenish the medication without removing the reservoir. Implantable devices can be prepared as known by a person skilled in the art. For example, a Port Delivery System may be implanted that is currently tested in a phase III clinical trial (ClinicalTrials.gov Identifier: NCT03677934).

Thus, the present invention refers also to an implantable device, in particular an implantable micro-drug delivery system, comprising a preferred Biochanin A derivative as defined above or a salt thereof and a pharmaceutical acceptable excipient and/or carrier.

In a preferred embodiment, the pharmaceutical pack, the eye drops, eye ointment and/or implantable device as described above is for use according to the present invention as described herein.

The salt of the preferred Biochanin A derivatives as defined above of all embodiments of the present invention is preferably a pharmaceutical acceptable salt of the respective Biochanin A derivative.

In a specific embodiment of the present invention, a preferred Biochanin A derivative as defined above or a salt thereof and/or the pharmaceutical composition of the present invention is used as a medicament for the treatment of BEST1-related retinopathies, in particular the so-called bestrophinopathies which may be selected from the group consisting of autosomal dominant Best macular dystrophy, vitelliform macular dystrophy-2 (VMD2), autosomal dominant vitreoretinochoroidopathy (ADVIRC), autosomal recessive bestrophinopathy, or pattern dystrophy, more preferably from the group consisting of autosomal dominant Best macular dystrophy, vitelliform macular dystrophy-2 (VMD2), autosomal recessive bestrophinopathy, or pattern dystrophy. The treatment of autosomal dominant BVMD is especially preferred.

In another specific embodiment of the present invention the Biochanin A derivative or a salt thereof and/or the pharmaceutical composition of the present invention is used in the manufacture of a medicament for the treatment of BEST1-related retinopathies, in particular the so-called bestrophinopathies which may be selected from the group consisting of autosomal dominant Best macular dystrophy, vitelliform macular dystrophy-2 (VMD2), autosomal dominant vitreoretinochoroidopathy (ADVIRC), autosomal recessive bestrophinopathy, or pattern dystrophy, more preferably from the group consisting of autosomal dominant Best macular dystrophy, vitelliform macular dystrophy-2 (VMD2), autosomal recessive bestrophinopathy, or pattern dystrophy. The treatment of autosomal dominant BVMD is especially preferred.

A further aspect of the present invention is a method of treating the above listed medical conditions by administering or applying a Biochanin A derivative as defined above or a salt thereof or a pharmaceutical composition comprising such a Biochanin A derivative or a salt thereof to a subject, in particular to a human or animal.

In yet a further aspect, the invention provides a method of improving chloride conductance across the basolateral membrane of the RPE in a subject in need thereof. The method comprises administering to the subject an effective amount of a preferred Biochanin A derivative as defined above or a salt thereof or a pharmaceutical composition comprising such a Biochanin A derivative or a salt thereof.

In still a further aspect, the invention provides a method of restoring BEST1 channel function. The method comprises administering to the subject an effective amount of a preferred Biochanin A derivative as defined above or a salt thereof or a pharmaceutical composition comprising such a Biochanin A derivative or a salt thereof.

Finally, the invention provides a method of activating other channels than BEST1 for compensating reduced anion transport activity of BEST1. The method comprises administering to the subject an effective amount of a preferred Biochanin A derivative as defined above or a salt thereof or a pharmaceutical composition comprising such a Biochanin A derivative or a salt thereof.

The following examples explain the present invention but are not considered to be limiting. It should be understood that the detailed description and specific examples disclosed herein, indicating particular embodiments of the invention, are given by way of illustration only, since various changes and modifications within the spirit and scope of the invention will become apparent to those skilled in the art from this description.

Example 1—Generation of Stable MDCKII Cell Lines

Transfection of MDCKII cells was performed with Lipofectamine 3000 transfection reagent following the manufacturer's (Thermofisher Scientific, Waltham, USA) instructions. MDCKII cells expressing wildtype and mutant BEST1 were cultured for 2 weeks in a selection medium containing 500 mg/ml G418 before single cell seeding in 96-well plates. 1-5 single clones of each cell line were selected.

Example 2—Generation of hiPSC-RPE Cell Lines from Best Macular Dystrophy Patients Skin biopsies were collected from Best macular dystrophy patients carrying disease associated mutations in the BEST1 gene as well as healthy controls. Adult human dermal fibroblasts were established and reprogrammed into human induced pluripotent stem cells (hiPSCs) via overexpression of transcription factors OCT3/4, Sox2, Klf4 and c-Myc (Takahashi et al., 2007). The cells were subsequently differentiated into hiPSC-derived RPE cells as described by Brandl et al. (2014).

Example 3—Immunofluorescence Labeling

Cell monolayers were fixed in 4% paraformaldehyde (PFA)/PBS for 10 minutes and blocked by PBS containing 0.3% Triton X-100 and 10% goat serum for 25 min. Incubation with primary antibody against BEST1 and fluorescent-conjugated secondary antibody was performed at 4° C. ON. Immunolabelled hiPSC-RPE or MDCKII cells were imaged on a Zeiss confocal microscope LSM 510 (Zeiss, Göttingen, Germany).

Example 4—YFP-Halide Transport Assay

Human hiPSC-RPE or MDCKII cells were transduced via lentivirus particles which were produced by co-transfecting HEK293T cells with the yellow fluorescence protein (YFPH148Q/I152L)-pLJM1 and helper plasmids pMD2.G and psPAX2 using the $Ca^{2+}$ phospate transfection method. After six weeks of cultivation in 96-well black microtiter plates, cells were incubated with 100 mM $Cl^-$ containing solution and basal YFP fluorescence was measured in a Tecan microplate reader. Subsequently $Cl^-$ was replaced with equimolar $I^-$ and decrease of YFP fluorescence intensity was monitored for another 2 min in 10 sec intervals.

Example 5—Whole-Cell Patch-Clamp Recordings

Human iPSC-RPE cells were trypsinized and seeded on fibronectin-coated glass cover slips for electrophysiological characterization. Whole-cell patch clamp recording was performed with an EPC10 patch clamp amplifier (HEKA Electronics) controlled by PatchMaster v2x90.2 Software. The capacitance and series resistance were adjusted using the built-in compensation algorithm. Patch pipettes had a tip resistance of 3-5 MΩ and were filled with internal solution containing (in mM): 40 mM CsCl, 100 mM Cs methanesulfonate, 1 mM $MgCl_2$, 5 mM EGTA, 4 mM ATP-$Na_2$ (added fresh) and 10 mM HEPES (pH 7.4). The free $Ca^{2+}$ concentration (Ca-EGTA Calculator TS v1.3) of 0.38 μM was obtained by adding $CaCl_2$. Voltage-driven inward and outward currents were induced by applying voltage-ramps (500 ms duration) from −60 to +120 mV in 2 sec intervals. The recipe of external solution was (in mM): 150 NaCl, 6 CsCl, 1.5 $CaCl_2$, 1 $MgCl_2$, 10 Glucose and 10 HEPES (pH 7.4).

Example 6—Generation of MDCKII Stable Cell Lines Expressing Normal and Mutant BEST1

Initially, stable MDCKII cell lines constitutively expressing normal BEST1 and disease-associated BEST1 mutants (i.e. p.(T6P), p.(L21V), p.(W93C), p.(R218C), p.(L224M), p.(Y227N), p.(F305S)) were established. The mutants are located in the four mutational hot-spots of BEST1 (White et al., 2000) (FIG. 1A). It was shown that polarized MDCKII cell lines are a well-suited model for studying protein trafficking and anion conductance in epithelial cells (Milenkovic et al., 2011; Milenkovic et al., 2018). Immunostaining for BEST1 with human polyclonal antibodies demonstrated protein localization to the plasma membrane for wildtype BEST1 and mutant BEST1-R218C, whereas the remaining 6 mutant proteins predominantly accumulated in the cytoplasm (FIG. 1B).

Example 7—Analysis of BEST1-Mediated Anion Transport in Cell Lines

To analyze BEST1-mediated anion transport in the cell lines generated in the previous examples, a well-established halide transport assay (Galietta et al., 2001) was adapted. All cell lines were virally transduced with the yellow YFP-based halide sensor YFP(H148Q/I152L) and seeded on black 96-well plates revealing a bright and uniform cell fluorescence highly sensitive to iodide ions (I—) (Jayaraman et al., 1999) (FIG. 2A). Addition of I— leads to specific YFP quenching over time and changes of fluorescence intensities can be monitored on a plate reader. MDCKII cells were incubated with 100 mM Cl— containing solution and steady state YFP fluorescence signal intensities were measured after 6 minutes. Subsequently, Cl— was replaced by equimolar I— and anion permeability was monitored by decreasing YFP intensities as a result of BEST1-mediated I— influx in a time course up to 2 minutes (FIG. 2B). For several independent BEST1 wildtype cell lines a fast kinetic of decreasing fluorescence intensities to ~30 to 40% was observed while the untransfected control cell lines remained flat (FIGS. 2C and D). To demonstrate the utility of this assay for characterizing channel function of BEST1, all Best macular dystrophy associated cell lines were analyzed under identical conditions. No significant differences in fluorescence intensities of mutant cell lines were found when compared to untransfected controls, demonstrating strongly reduced channel activity in BEST1 mutants, while cell line expressing wildtype BEST1 showed a fast kinetic of decreasing fluorescence signals as a result of BEST1-mediated ionic flux (FIG. 2C). Together, these data demonstrate that the assay is a suitable system for testing whether a compound is acting on BEST1 ion channels by either enhancing residual BEST1 channel function (potentiators) or activating other channels than BEST1 compensating its reduced anion transport activity.

Example 8—Evaluation of BioA(C2H3O2)2 activity in MDCKII cells MDCKII cells co-expressing YFP and BEST1 wildtype or mutant p.(R218C) were seeded on black 96-well plates and cultivated for 6 days to achieve polarity, a requirement for correct basolateral localization of BEST1 in epithelial cells. Compounds were tested separately at 10 μM concentration in a 96-well format. After compound addition for 24 h, cells were subjected to an inwardly directed I— gradient to drive I— influx and produce decreasing (quenched) fluorescence signals. Each assay consisted of recording of base-line fluorescence for 10 seconds (=100% value), followed by 120 seconds of recording of decreasing fluorescence after addition of the I— containing solution. FIG. 3 shows a schematic of the screening approach. The effect on the kinetics of I— influx was tested for BioA$(C_2H_3O_2)_2$ (FIG. 4A-D). Both, BEST1 wildtype cell lines and untransfected controls showed no or only little effect upon $(C_2H_3O_2)_2$ delivery (FIG. 4B), while anion transport activity was strongly and moderately increased for mutant BEST1-R218C and BEST-Y227N, respectively, at various concentrations (from 2 μM to 20 μM) (FIG. 4C). Of note, Biochanin A (BioA) showed no effect on BEST1-mediated I— influx (FIG. 4D).

Example 9—Evaluation of BioA(C2H3O2)2 Biological Activity in hiPSC-RPE Cells Generated from a Patient with Best Macular Dystrophy Next, it was tested whether the results from the fluorescence-based assay in MDCKII cell lines can be verified in a cell line-based disease-relevant model system. To this end, iPSC-RPEs from skin fibroblasts of a healthy donor (hiPSC-RPE+/+) and a Best macular dystrophy patient heterozygous for BEST1 mutation p.(R218C) (hiPSC-RPE-R218C/+) was generated. Consistent with results from immunostaining of BEST1 in the MDCKII test series, correct localization of BEST1 was confirmed on the plasma membrane of BioA $(C_2H_3O_2)_2$-treated mutant and control hiPSC-RPEs (FIG. 5A). Subsequently, whole-cell patch clamp recordings were performed to analyze calcium-activated chloride currents in treated and untreated hiPSC-RPE cells versus control. As shown in FIG. 5, hiPSC-RPE+/+ produce significant Cl— current amplitudes, that are greatly diminished in hiPSC-RPE-R218C/+ cells. However, addition of 10 μM BioA (C2H3O2)2 led to a significant increase of Cl— currents in hiPSC-RPER218C/+ cells confirming the potency of BioA $(C_2H_3O_2)_2$ to enhance BEST1 channel function in the RPE (FIGS. 5B and C).

Example 10—Evaluation of Activity of Several Biochanin A Compounds/Derivatives in MDCKII Cells MDCKII cells co-expressing yellow fluorescence protein (YFP) and mutant BEST1 R218C were seeded on black 96-well plates and cultivated for 6 days to achieve polarity, a crucial requirement for correct basolateral localization of BEST1 in epithelial cells. Compounds were tested at 5 μM concentration in a 96-well format. After compound addition for 24 h, cells were subjected to an outwardly directed iodid (I⁻)-gradient to drive BEST1-mediated I⁻ efflux and produce increasing fluorescence signals. Each assay consisted of recording of YFP quenching after I⁻ pre-incubation for 6 min (=100% value), followed by 7 min of recording of increasing fluorescence after addition of the chloride (Cr) containing solution. Changes of fluorescence intensities were monitored on a plate reader. The effect on the kinetics of I— efflux was tested for Biochanin A (FIG. 6A), Trimethoxyisoflavone (FIG. 6B), 5,4-dimethoxy hydroxyisoflavone (FIG. 6C), Biochanin A-7-methyl ether (FIG. 6D), Biochanin A-7-acetate (FIG. 6E), Biochanin A diacetate (FIG. 6F), Biochanin A-7-pentanoate (FIG. 6G), Biochanin A dipentanoate (FIG. 6H), Biochanin A-7-pivalate (FIG. 7A), Biochanin A-dipavalate (FIG. 7B), Biochanin A-7-acrylate (FIG. 7C), Biochanin A diacrylate (FIG. 7D), Biochanin A-7-methyl fumarate (FIG. 7E), Biochanin A-di(methyl fumarate) (FIG. 7F), Biochanin A-7-butylcarbamate (FIG. 7G), Biochanin A di(butylcarbamate) (FIG. 7H), Biochanin A-7-phosphate disodium salt (FIG. 8A), Biochanin A-7-isopropylate (FIG. 8B), 7-pivaloxymethyl-Biochanin A (FIG. 8C), Biochanin A diisopropylate (FIG. 8D), Biochanin A-7-isopropyl carbonate (FIG. 8E), Biochanin A diisopropyl carbonate (FIG. 8F), Isopropyloxycarbonylmethoxy-Biochanin A (FIG. 8G). While Biochanin A (FIG. 6A), Trimethoxyisoflavone (FIG. 6B), 5,4-dimethoxy-7-hydroxyisoflavone (FIG. 6C), Biochanin A-7-methyl ether (FIG. 6D), Biochanin A-7-acetate (FIG. 6E), Biochanin A-7-pentanoate (FIG. 6G), Biochanin A-7-pivalate (FIG. 7A), Biochanin A-7-methyl fumarate (FIG. 7E), Biochanin A-7-butylcarbamate (FIG. 7G), Biochanin A-7-isopropylate (FIG. 8B), showed no or only minimal effect upon addition of respective compound delivery in comparison to untreated cells, anion transport activity was noticeable increased for mutant BEST1-R218C upon addition of Biochanin A-dipavalate (FIG. 7B), Biochanin A-7-acrylate (FIG. 7C), Biochanin A-7-phosphate disodium salt (FIG. 8A), 7-pivaloxymethyl-Biochanin A (FIG. 8C), Isopropyloxycarbonylmethoxy-Biochanin A (FIG. 8G) and strongly increased upon addition of Biochanin A diacetate (FIG. 6F), Biochanin A dipentanoate (FIG. 6H), Biochanin A diacrylate (FIG. 7D), Biochanin A-di(methyl fumarate) (FIG. 7F), Biochanin A di(butylcarbamate) (FIG. 7H), Biochanin A diisopropylate (FIG. 8D), Biochanin A-7-isopropyl carbonate (FIG. 8E), Biochanin A diisopropyl carbonate (FIG. 8F).

REFERENCES

Boon, C. J., Theelen, T., Hoefsloot, E. H. et al. (2009) Clinical and molecular genetic analysis of best vitelliform macular dystrophy. *Retina* 29: 835-847.

Brandi, C., Zimmermann, S. J., Milenkovic, V. M., Rosendahl, S. M., Grassmann, F., Milenkovic, A., Hehr, U., Federlin, M., Wetzel, C. H., Helbig, H. et al. (2014). In-Depth Characterisation of Retinal Pigment Epithelium (RPE) Cells Derived from Human Induced Pluripotent Stem Cells (hiPSC). *Neuromolecular Med.*

Burgess, R., Millar, I. D., Leroy, B. P., Urquhart, J. E., Fearon, I. M., De Baere, E., Brown, P. D., Robson, A. G., Wright, G. A., Kestelyn, P. et al. (2008). Biallelic mutation of BEST1 causes a distinct retinopathy in humans. *Am J Hum Genet* 82, 19-31.

Galietta, L. V., Jayaraman, S. and Verkman, A. S. (2001). Cell-based assay for high-throughput quantitative screening of CFTR chloride transport agonists. *Am J Physiol Cell Physiol* 281, C1734-42.

Jayaraman, S., Teitler, L., Skalski, B. and Verkman, A. S. (1999). Long-wavelength iodide-sensitive fluorescent indicators for measurement of functional CFTR expression in cells. *Am J Physiol* 277, C1008-18.

Khan, K. N., Islam, F., Moore, A. T. et al. (2018) The fundus phenotype associated with the p.Ala243Val BEST1 mutation. *Retina* 38: 606-613.

Marquardt, A., Stohr, H., Passmore, L. A., Kramer, F., Rivera, A. and Weber, B. H. (1998). Mutations in a novel gene, VMD2, encoding a protein of unknown properties cause juvenile-onset vitelliform macular dystrophy (Best's disease). *Hum Mol Genet* 7, 1517-25.

Milenkovic, A., Milenkovic, V. M., Wetzel, C. H. and Weber, B. H. F. (2018). BEST1 protein stability and degradation pathways differ between autosomal dominant Best disease and autosomal recessive bestrophinopathy accounting for the distinct retinal phenotypes. *Hum Mol Genet* 27, 1630-1641.

Milenkovic, V. M., Rohrl, E., Weber, B. H. and Strauss, O. (2011). Disease-associated missense mutations in bestrophin-1 affect cellular trafficking and anion conductance. *J Cell Sci* 124, 2988-96.

Petrukhin, K., Koisti, M. J., Bakall, B., Li, W., Xie, G., Marknell, T., Sandgren, O., Forsman, K., Holmgren, G., Andreasson, S. et al. (1998). Identification of the gene responsible for Best macular dystrophy. *Nat Genet* 19, 241-7.

Takahashi, K., Tanabe, K., Ohnuki, M., Narita, M., Ichisaka, T., Tomoda, K. and Yamanaka, S. (2007). Induction of pluripotent stem cells from adult human fibroblasts by defined factors. *Cell* 131, 861-72.

White, K., Marquardt, A. and Weber, B. H. (2000). VMD2 mutations in vitelliform macular dystrophy (Best disease) and other maculopathies. *Hum Mutat* 15, 301-8.

Yardley, J., Leroy, B. P., Hart-Holden, N., Lafaut, B. A., Loeys, B., Messiaen, L. M., Perveen, R., Reddy, M. A., Bhattacharya, S. S., Traboulsi, E. et al. (2004). Mutations of VMD2 splicing regulators cause nanophthalmos and autosomal dominant vitreoretinochoroidopathy (ADVIRC). *Invest Ophthalmol Vis Sci* 45, 3683-9.

The invention claimed is:

1. A method of treating a BEST1-related retinopathy, comprising administering to a subject in need a Biochanin A derivative or a salt thereof, wherein said Biochanin A derivative has the formula (II):

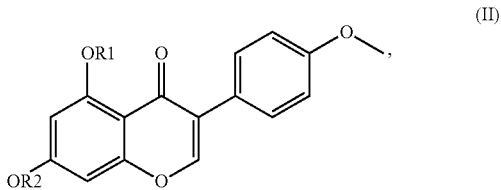

(II)

wherein
R1 is a proton, or OR1 is acetate, pentanoate, isopropylate, acrylate, methyl fumarate, butylcarbamate, isopropyl carbonate, isopropyloxycarbonylmethoxy, phosphate disodium salt or pivaloxymethyl, and
OR2 is acetate, pentanoate, isopropylate, acrylate, methyl fumarate, butylcarbamate, isopropyl carbonate, isopropyloxycarbonylmethoxy, phosphate disodium salt or pivaloxymethyl,
under the provision that when R1 is a proton, OR2 is acrylate, isopropyl carbonate, isopropyloxycarbonlymethoxy, phosphate disodium salt or pivaloxymethyl.

2. The method according to claim 1, wherein OR1 and OR2 are the same or R1 is a proton and OR2 is isopropyl carbonate.

3. The method according to claim 1, wherein the Biochanin A derivative or salt thereof is selected from the group consisting of: Biochanin A diacetate, Biochanin A dipentanoate, Biochanin A diacrylate, Biochanin A di(methyl fumarate), Biochanin A-7-isopropyl carbonate, Biochanin A di(butylcarbamate), Biochanin A diisopropyl carbonate, Biochanin A diphosphate tetrasodium salt, Dipivaloxymethyl-Biochanin A, Biochanin A diisopropylate, Diisopropyloxycarbonylmethoxy-Biochanin A.

4. The method according to claim 1, wherein treating a BEST1-related retinopathy comprises delaying progression of a BEST1-related retinopathy.

5. The method according to claim 1, wherein the Biochanin A derivative or a salt thereof is administered in an amount sufficient to (i) improve chloride conductance across the basolateral membrane of the retinal pigment epithelium, and/or (ii) restore BEST1 channel function.

6. The method according to claim 1, wherein the Biochanin A derivative or a salt thereof is administered in an amount sufficient for activating other channels than BEST1 for compensating impaired anion transport activity of BEST1.

7. The method according to claim 1, wherein the method of treating comprises the steps of
(i) evaluating the subject's vision before treatment;
(ii) molecular genetic testing of the BEST1 gene;
(iii) administering a Biochanin A derivative or a salt thereof to the subject; and
(iv) evaluating of subject's vision after step (iii).

8. The method according to claim 1, wherein the Biochanin A derivative or the salt thereof is formulated for topical, oral, ocular and/or intraocular administration.

9. The method according to claim 1, wherein the Biochanin A derivative or a salt thereof is formulated in form of eye drops, an eye ointment, a tablet, a capsule, a dragee, a pill, an injectable solution or an implantable device.

10. The method according to claim 1, wherein the Biochanin A derivative according to formula (II) or salt thereof is dispersed in a pharmaceutical acceptable excipient and/or carrier.

11. The method according to claim 1, wherein the BEST1-related retinopathy is a bestrophinopathy.

12. The method according to claim 1, wherein the BEST1-related retinopathy is characterized by an impaired anion transport activity of BEST1.

13. The method according to claim 1, wherein the BEST1-related retinopathy is selected from the group consisting of autosomal dominant Best macular dystrophy, autosomal recessive bestrophinopathy, or pattern dystrophy, in particular pattern dystrophy due to BEST1 mutation p(Ala243Val).

14. The method according to claim 1, wherein the Biochanin A derivative or salt thereof is in the form of an eye drop, an eye ointment or an implantable device, in particular a micro-drug delivery system.

15. The method according to claim 1, wherein the Biochanin A derivative or salt thereof is disposed in a pharmaceutical pack comprising one or more compartments.

16. The method according to claim 1, wherein the BEST1-related retinopathy is autosomal dominant Best vitelliform macular dystrophy.

17. The method according to claim 4, wherein the BEST1-related retinopathy is autosomal dominant Best vitelliform macular dystrophy.

* * * * *

SEQUENCE LISTING

<160> NUMBER OF SEQ ID NOS: 2

<210> SEQ ID NO 1
<211> LENGTH: 585
<212> TYPE: PRT
<213> ORGANISM: Homo sapiens

<400> SEQUENCE: 1

Met Thr Ile Thr Tyr Thr Ser Gln Val Ala Asn Ala Arg Leu Gly Ser
1               5                   10                  15

Phe Ser Arg Leu Leu Leu Cys Trp Arg Gly Ser Ile Tyr Lys Leu Leu
            20                  25                  30

Tyr Gly Glu Phe Leu Ile Phe Leu Leu Cys Tyr Tyr Ile Ile Arg Phe
        35                  40                  45

```
Ile Tyr Arg Leu Ala Leu Thr Glu Glu Gln Gln Leu Met Phe Glu Lys
 50                  55                  60

Leu Thr Leu Tyr Cys Asp Ser Tyr Ile Gln Leu Ile Pro Ile Ser Phe
 65                  70                  75                  80

Val Leu Gly Phe Tyr Val Thr Leu Val Val Thr Arg Trp Trp Asn Gln
                 85                  90                  95

Tyr Glu Asn Leu Pro Trp Pro Asp Arg Leu Met Ser Leu Val Ser Gly
             100                 105                 110

Phe Val Glu Gly Lys Asp Glu Gln Gly Arg Leu Leu Arg Arg Thr Leu
         115                 120                 125

Ile Arg Tyr Ala Asn Leu Gly Asn Val Leu Ile Leu Arg Ser Val Ser
 130                 135                 140

Thr Ala Val Tyr Lys Arg Phe Pro Ser Ala Gln His Leu Val Gln Ala
 145                 150                 155                 160

Gly Phe Met Thr Pro Ala Glu His Lys Gln Leu Glu Lys Leu Ser Leu
                 165                 170                 175

Pro His Asn Met Phe Trp Val Pro Trp Val Trp Phe Ala Asn Leu Ser
             180                 185                 190

Met Lys Ala Trp Leu Gly Gly Arg Ile Arg Asp Pro Ile Leu Leu Gln
         195                 200                 205

Ser Leu Leu Asn Glu Met Asn Thr Leu Arg Thr Gln Cys Gly His Leu
 210                 215                 220

Tyr Ala Tyr Asp Trp Ile Ser Ile Pro Leu Val Tyr Thr Gln Val Val
 225                 230                 235                 240

Thr Val Ala Val Tyr Ser Phe Phe Leu Thr Cys Leu Val Gly Arg Gln
                 245                 250                 255

Phe Leu Asn Pro Ala Lys Ala Tyr Pro Gly His Glu Leu Asp Leu Val
             260                 265                 270

Val Pro Val Phe Thr Phe Leu Gln Phe Phe Phe Tyr Val Gly Trp Leu
         275                 280                 285

Lys Val Ala Glu Gln Leu Ile Asn Pro Phe Gly Glu Asp Asp Asp Asp
 290                 295                 300

Phe Glu Thr Asn Trp Ile Val Asp Arg Asn Leu Gln Val Ser Leu Leu
 305                 310                 315                 320

Ala Val Asp Glu Met His Gln Asp Leu Pro Arg Met Glu Pro Asp Met
                 325                 330                 335

Tyr Trp Asn Lys Pro Glu Pro Gln Pro Pro Tyr Thr Ala Ala Ser Ala
             340                 345                 350

Gln Phe Arg Arg Ala Ser Phe Met Gly Ser Thr Phe Asn Ile Ser Leu
         355                 360                 365

Asn Lys Glu Glu Met Glu Phe Gln Pro Asn Gln Glu Asp Glu Glu Asp
 370                 375                 380

Ala His Ala Gly Ile Ile Gly Arg Phe Leu Gly Leu Gln Ser His Asp
 385                 390                 395                 400

His His Pro Pro Arg Ala Asn Ser Arg Thr Lys Leu Leu Trp Pro Lys
                 405                 410                 415

Arg Glu Ser Leu Leu His Glu Gly Leu Pro Lys Asn His Lys Ala Ala
             420                 425                 430

Lys Gln Asn Val Arg Gly Gln Glu Asp Asn Lys Ala Trp Lys Leu Lys
         435                 440                 445

Ala Val Asp Ala Phe Lys Ser Ala Pro Leu Tyr Gln Arg Pro Gly Tyr
 450                 455                 460

Tyr Ser Ala Pro Gln Thr Pro Leu Ser Pro Thr Pro Met Phe Phe Pro
```

```
       465                 470                 475                 480
Leu Glu Pro Ser Ala Pro Ser Lys Leu His Ser Val Thr Gly Ile Asp
                    485                 490                 495
Thr Lys Asp Lys Ser Leu Lys Thr Val Ser Ser Gly Ala Lys Lys Ser
                500                 505                 510
Phe Glu Leu Leu Ser Glu Ser Asp Gly Ala Leu Met Glu His Pro Glu
            515                 520                 525
Val Ser Gln Val Arg Arg Lys Thr Val Glu Phe Asn Leu Thr Asp Met
        530                 535                 540
Pro Glu Ile Pro Glu Asn His Leu Lys Glu Pro Leu Glu Gln Ser Pro
545                 550                 555                 560
Thr Asn Ile His Thr Thr Leu Lys Asp His Met Asp Pro Tyr Trp Ala
                565                 570                 575
Leu Glu Asn Arg Asp Glu Ala His Ser
                580                 585

<210> SEQ ID NO 2
<211> LENGTH: 1758
<212> TYPE: DNA
<213> ORGANISM: Homo sapiens

<400> SEQUENCE: 2
```

| | | | | | |
|---|---|---|---|---|---|
| atgaccatca | cttacacaag | ccaagtggct | aatgcccgct | taggctcctt | ctcccgcctg | 60 |
| ctgctgtgct | ggcggggcag | catctacaag | ctgctatatg | gcgagttctt | aatcttcctg | 120 |
| ctctgctact | acatcatccg | ctttatttat | aggctggccc | tcacggaaga | caacagctg | 180 |
| atgtttgaga | aactgactct | gtattgcgac | agctacatcc | agctcatccc | catttccttc | 240 |
| gtgctgggct | tctacgtgac | gctggtcgtg | acccgctggt | ggaaccagta | cgagaacctg | 300 |
| ccgtggcccg | accgcctcat | gagcctggtg | tcgggcttcg | tcgaaggcaa | ggacgagcaa | 360 |
| ggccggctgc | tgcggcgcac | gctcatccgc | tacgccaacc | tgggcaacgt | gctcatcctg | 420 |
| cgcagcgtca | gcaccgcagt | ctacaagcgc | ttccccagcg | cccagcacct | ggtgcaagca | 480 |
| ggctttatga | ctccggcaga | aacacaagca | gttggagaaac | tgagcctacc | acacaacatg | 540 |
| ttctgggtgc | cctgggtgtg | gtttgccaac | ctgtcaatga | aggcgtggct | ggaggtcga | 600 |
| atccgggacc | ctatcctgct | ccagagcctg | ctgaacgaga | tgaacaccct | gcgtactcag | 660 |
| tgtgacacc | tgtatgccta | cgactggatt | agtatcccac | tggtgtatac | acaggtggtg | 720 |
| actgtggcgg | tgtacagctt | cttcctgact | tgtctagttg | gcggcagtt | tctgaaccca | 780 |
| gccaaggcct | accctggcca | tgagctggac | ctcgttgtgc | ccgtcttcac | gttcctgcag | 840 |
| ttcttcttct | atgttggctg | gctgaaggtg | gcagagcagc | tcatcaaccc | ctttggagag | 900 |
| gatgatgatg | attttgagac | caactggatt | gtcgacagga | atttgcaggt | gtccctgttg | 960 |
| gctgtggatg | agatgcacca | ggacctgcct | cggatggagc | cggacatgta | ctggaataag | 1020 |
| cccgagccac | agccccccta | cacagctgct | tccgcccagt | tccgtcgagc | tccctttatg | 1080 |
| ggctccacct | tcaacatcag | cctgaacaaa | gaggagatgg | agttccagcc | caatcaggag | 1140 |
| gacgaggagg | atgctcacgc | tggcatcatt | ggccgcttcc | taggcctgca | gtcccatgat | 1200 |
| caccatcctc | ccagggcaaa | ctcaaggacc | aaactactgt | ggcccaagag | ggaatccctt | 1260 |
| ctccacgagg | gcctgcccaa | aaaccacaag | gcagccaaac | agaacgttag | gggccaggaa | 1320 |
| gacaacaagg | cctggaagct | taaggctgtg | gacgccttca | gtctgccccc | actgtatcag | 1380 |
| aggccaggct | actacagtgc | cccacagacg | cccctcagcc | ccactccat | gttcttcccc | 1440 |

```
ctagaaccat cagcgccgtc aaagcttcac agtgtcacag gcatagacac caaagacaaa    1500
agcttaaaga ctgtgagttc tggggccaag aaaagttttg aattgctctc agagagcgat    1560
ggggccttga tggagcaccc agaagtatct caagtgagga ggaaaactgt ggagtttaac    1620
ctgacggata tgccagagat ccccgaaaat cacctcaaag aacctttgga acaatcacca    1680
accaacatac acactacact caaagatcac atggatcctt attgggcctt ggaaaacagg    1740
gatgaagcac attcctaa                                                  1758
```